(12) United States Patent
Speer

(10) Patent No.: US 9,426,173 B2
(45) Date of Patent: Aug. 23, 2016

(54) SYSTEM AND METHOD FOR ELIMINATION OF SPAM IN A DATA STREAM ACCORDING TO INFORMATION DENSITY

(71) Applicant: Luminoso Technologies, Inc., Cambridge, MA (US)

(72) Inventor: Robert Speer, Cambridge, MA (US)

(73) Assignee: Luminoso Technologies, Inc., Cambridge, MA (US)

( * ) Notice: Subject to any disclaimer, the term of this patent is extended or adjusted under 35 U.S.C. 154(b) by 249 days.

(21) Appl. No.: 14/478,017

(22) Filed: Sep. 5, 2014

(65) Prior Publication Data

US 2016/0072827 A1    Mar. 10, 2016

(51) Int. Cl.
  *G06F 15/16* (2006.01)
  *H04L 29/06* (2006.01)
  *H04L 12/58* (2006.01)
  *G06F 17/30* (2006.01)

(52) U.S. Cl.
  CPC ........ *H04L 63/145* (2013.01); *G06F 17/30153* (2013.01); *G06F 17/30516* (2013.01); *G06F 17/30914* (2013.01); *H04L 51/12* (2013.01)

(58) Field of Classification Search
  None
  See application file for complete search history.

(56) References Cited

U.S. PATENT DOCUMENTS

| 7,257,773 | B1 | 8/2007 | Jagger et al. |
| 7,962,510 | B2 | 6/2011 | Najork et al. |
| 2006/0095521 | A1* | 5/2006 | Patinkin ............... G06Q 10/107 709/206 |
| 2008/0127340 | A1 | 5/2008 | Lee |
| 2008/0256093 | A1* | 10/2008 | Amitay ............. G06F 17/30675 |
| 2009/0089373 | A1 | 4/2009 | Donato et al. |
| 2010/0161537 | A1* | 6/2010 | Liu ....................... H04L 41/142 706/46 |
| 2014/0277590 | A1* | 9/2014 | Brown ................... G05B 11/01 700/3 |

OTHER PUBLICATIONS

Bratko et al., Spam Filtering Using Compression Models, Department of Intelligent Systems, Jozef Stefan Institute, Technical Report IJS-DP 9227, Dec. 6, 2005.

* cited by examiner

*Primary Examiner* — Kenny Lin
(74) *Attorney, Agent, or Firm* — Law Office of Ilya Libenzon

(57) ABSTRACT

A method for elimination of spam in a data stream according to information density, includes receiving, by a computing device, a stream of messages. The method includes directing, by the computing device, the stream into at least one buffer. The method includes repeatedly compressing, by the computing device, data in the buffer using a lossless compression algorithm. The method includes identifying, by the computing device, at least one first message in the buffer as spam, by determining that the at least one first message has been compressed below a threshold level.

13 Claims, 4 Drawing Sheets

SYSTEM AND METHOD FOR ELIMINATION OF SPAM IN A DATA STREAM ACCORDING TO INFORMATION DENSITY

TECHNICAL FIELD

Embodiments disclosed herein relate generally to processing streamed data, and specifically to filtering data streams to eliminate unwanted messages.

BACKGROUND ART

Data streamed over electronic networks have become an increasingly vital source of information. Users around the world routinely consume data streams to receive updates on subjects of import to the users, ranging from the personal lives of friends or celebrities to information regarding events of national or international import. Because data streams can draw upon input from individual users virtually anywhere, streaming services are often the very first to convey information concerning events as they occur, often scooping professional news services. However, the decentralized nature of data streams that gives them their power also makes them prone for abuse. Unscrupulous people can choke a data stream with useless information such as automatically generated spam produced for commercial or political purposes, or for the sake of sheer mischief. Traditional spam filters that search incoming messages for words associated with spam are too easily defeated by superficial variations in message content and by the combinatoric explosion inherent in maintaining vast databases of unwanted terms. Even worse, such methods can misidentify useful messages as spam based on content, creating a kind of censorship and undermining the very usefulness of the streaming services.

There is thus a need for an efficient, accurate, and relatively inevitable technology for removing spam from data streaming services.

SUMMARY OF THE EMBODIMENTS

A method is disclosed for elimination of spam in a data stream according to information density. The method includes receiving, by a computing device, a stream of messages, directing, by the computing device, the stream into at least one buffer, repeatedly compressing, by the computing device, data in the buffer using a lossless compression algorithm, and identifying, by the computing device, at least one first message in the buffer as spam, by determining that the at least one first message has been compressed below a threshold level.

In a related embodiment, receiving further involves receiving a stream of messages containing textual data. In another embodiment, compressing further includes determining that a term in the buffer has been encountered previously, mapping the term to a single character representation, and replacing the term in the buffer with the single character representation. In an additional embodiment, determining that the at least one first message has been compressed below a threshold level also involves determining that the ratio of the compressed size of the at least one first message to the uncompressed size of the at least one first message is smaller than a threshold number. A further embodiment also includes deleting the at least one first message. A still further embodiment also involves storing the at least one first message in a spam folder. Yet another embodiment additionally involves identifying an account from which the at least one first message originated. Another embodiment still involves publishing the account to a user of the computing device. An additional embodiment includes blocking the reception of future messages from the account.

Another related embodiment includes determining that at least one second message in the buffer is not spam. Determining that the at least one second message is not spam further involves maintaining in memory accessible to the computing device a datum representing a quantity of data received in the stream, determining that the computing device has received a greater quantity of data in the stream than the quantity represented by the datum since receiving the at least one second message, and determining that the at least one second message has not compressed below the threshold level. In another embodiment, determining that the at least one second message is not spam also includes maintaining in memory accessible to the computing device a datum representing a number of compression cycles, determining that the computing device has performed a greater number of compression cycles than the datum since receiving the at least one second message, and determining that the at least one second message has not compressed below the threshold level. Another embodiment involves providing the at least one second message to a user of the computing device.

Also disclosed is a system for elimination of spam in a data stream according to information density. The system includes a computing device. The system includes at least one receiver, executing on the computing device, and configured to receive a stream of messages and direct the stream into at least one buffer. The system includes at least one compressor, executing on the computing device, and configured to repeatedly compress data in the buffer using a lossless compression algorithm. The system includes at least one classifier, executing on the computing device and configured to identify at least one message in the buffer as spam by determining that the at least one first message has been compressed below a threshold level.

Other aspects, embodiments and features of the system and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the system and method shown where illustration is not necessary to allow those of ordinary skill in the art to understand the system and method.

BRIEF DESCRIPTION OF THE DRAWINGS

The preceding summary, as well as the following detailed description of the disclosed system and method, will be better understood when read in conjunction with the attached drawings. For the purpose of illustrating the system and method, presently preferred embodiments are shown in the drawings. It should be understood, however, that neither the system nor the method is limited to the precise arrangements and instrumentalities shown.

DETAILED DESCRIPTION OF SPECIFIC EMBODIMENTS

Figure 1A:
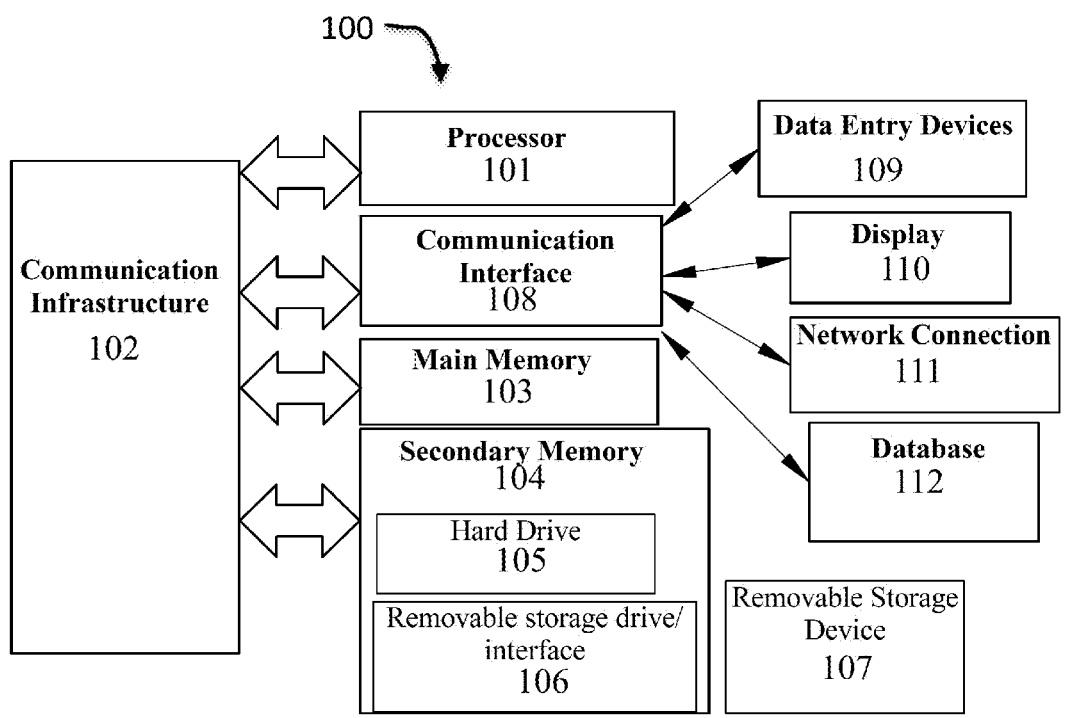
FIG. 1A is a schematic diagram depicting an example of an computing device as described herein.

Some embodiments of the disclosed system and methods will be better understood by reference to the following comments concerning computing devices. A "computing device" may be defined as including personal computers, laptops, tablets, smart phones, and any other computing device capable of supporting an application as described herein. The system and method disclosed herein will be better understood in light of the following observations concerning the computing devices that support the disclosed application, and concerning the nature of web applications in general. An exemplary computing device is illustrated by FIG. 1A. The processor 101 may be a special purpose or a general-purpose processor device. As will be appreciated by persons skilled in the relevant art, the processor device 101 may also be a single processor in a multi-core/multiprocessor system, such system operating alone, or in a cluster of computing devices operating in a cluster or server farm. The processor 101 is connected to a communication infrastructure 102, for example, a bus, message queue, network, or multi-core message-passing scheme.

The computing device also includes a main memory 103, such as random access memory (RAM), and may also include a secondary memory 104. Secondary memory 104 may include, for example, a hard disk drive 105, a removable storage drive or interface 106, connected to a removable storage unit 107, or other similar means. As will be appreciated by persons skilled in the relevant art, a removable storage unit 107 includes a computer usable storage medium having stored therein computer software and/or data. Examples of additional means creating secondary memory 104 may include a program cartridge and cartridge interface (such as that found in video game devices), a removable memory chip (such as an EPROM, or PROM) and associated socket, and other removable storage units 107 and interfaces 106 which allow software and data to be transferred from the removable storage unit 107 to the computer system. In some embodiments, to "maintain" data in the memory of a computing device means to store that data in that memory in a form convenient for retrieval as required by the algorithm at issue, and to retrieve, update, or delete the data as needed.

The computing device may also include a communications interface 108. The communications interface 108 allows software and data to be transferred between the computing device and external devices. The communications interface 108 may include a modem, a network interface (such as an Ethernet card), a communications port, a PCMCIA slot and card, or other means to couple the computing device to external devices. Software and data transferred via the communications interface 108 may be in the form of signals, which may be electronic, electromagnetic, optical, or other signals capable of being received by the communications interface 108. These signals may be provided to the communications interface 108 via wire or cable, fiber optics, a phone line, a cellular phone link, and radio frequency link or other communications channels. Other devices may be coupled to the computing device 100 via the communications interface 108. In some embodiments, a device or component is "coupled" to a computing device 100 if it is so related to that device that the product or means and the device may be operated together as one machine. In particular, a piece of electronic equipment is coupled to a computing device if it is incorporated in the computing device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the computing device by shared membership in some network consisting of wireless and wired connections between multiple machines (e.g. a printer in an office that prints documents to computers belonging to that office, no matter where they are, so long as they and the printer can connect to the internet). A computing device 100 may be coupled to a second computing device (not shown); for instance, a server may be coupled to a client device, as described below in greater detail.

The communications interface in the system embodiments discussed herein facilitates the coupling of the computing device with data entry devices 109, the device's display 110, and network connections, whether wired or wireless 111. In some embodiments, "data entry devices" 109 are any equipment coupled to a computing device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure. A computing device's "manual data entry devices" is the set of all data entry devices coupled to the computing device that permit the user to enter data into the computing device using manual manipulation. Manual entry devices include without limitation keyboards, keypads, touchscreens, track-pads, computer mice, buttons, and other similar components. A computing device may also possess a navigation facility. The computing device's "navigation facility" may be any facility coupled to the computing device that enables the device accurately to calculate the device's location on the surface of the Earth. Navigation facilities can include a receiver configured to communicate with the Global Positioning System or with similar satellite networks, as well as any other system that mobile phones or other devices use to ascertain their location, for example by communicating with cell towers. A code scanner coupled to a computing device is a device that can extract information from a "code" attached to an object. In one embodiment, a code contains data concerning the object to which it is attached that may be extracted automatically by a scanner; for instance, a code may be a bar code whose data may be extracted using a laser scanner. A code may include a quick-read (QR) code whose data may be extracted by a digital scanner or camera. A code may include a radio frequency identification (RFID) tag.

In some embodiments, a computing device's "display" 109 is a device coupled to the computing device, by means of which the computing device can display images. Display include without limitation monitors, screens, television devices, and projectors.

Computer programs (also called computer control logic) are stored in main memory 103 and/or secondary memory 104. Computer programs may also be received via the communications interface 108. Such computer programs, when executed, enable the processor device 101 to implement the system embodiments discussed below. Accordingly, such computer programs represent controllers of the system.

Where embodiments are implemented using software, the software may be stored in a computer program product and loaded into the computing device using a removable storage drive or interface 106, a hard disk drive 105, or a communications interface 108.

The computing device may also store data in database 112 accessible to the device. A database 112 is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database 112, and can be accessed by more complex queries, using languages such as Structured Query Language, which retrieve data based on limiting values passed as parameters and relationships between the data being retrieved. More specialized queries, such as image matching queries, may also be used to search some databases. A database can be created in any digital memory.

Persons skilled in the relevant art will also be aware that while any computing device must necessarily include facilities to perform the functions of a processor 101, a communication infrastructure 102, at least a main memory 103, and usually a communications interface 108, not all devices will necessarily house these facilities separately. For instance, in some forms of computing devices as defined above, processing 101 and memory 103 could be distributed through the same hardware device, as in a neural net, and thus the communications infrastructure 102 could be a property of the configuration of that particular hardware device. Many devices do practice a physical division of tasks as set forth above, however, and practitioners skilled in the art will understand the conceptual separation of tasks as applicable even where physical components are merged.

The systems may be deployed in a number of ways, including on a stand-alone computing device, a set of computing devices working together in a network, or a web application. Persons of ordinary skill in the art will recognize a web application as a particular kind of computer program system designed to function across a network, such as the Internet. A schematic illustration of a web application platform is provided in FIG. 1A. Web application platforms typically include at least one client device 120, which is an computing device as described above. The client device 120 connects via some form of network connection to a network 121, such as the Internet. The network 121 may be any arrangement that links together computing devices 120, 122, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network 121 is at least one server 122, which is also an computing device as described above, or a set of computing devices that communicate with each other and work in concert by local or network connections. Of course, practitioners of ordinary skill in the relevant art will recognize that a web application can, and typically does, run on several servers 122 and a vast and continuously changing population of client devices 120. Computer programs on both the client device 120 and the server 122 configure both devices to perform the functions required of the web application 123. Web applications 123 can be designed so that the bulk of their processing tasks are accomplished by the server 122, as configured to perform those tasks by its web application program, or alternatively by the client device 120. Some web applications 123 are designed so that the client device 120 solely displays content that is sent to it by the server 122, and the server 122 performs all of the processing, business logic, and data storage tasks. Such "thin client" web applications are sometimes referred to as "cloud" applications, because essentially all computing tasks are performed by a set of servers 122 and data centers visible to the client only as a single opaque entity, often represented on diagrams as a cloud.

Many computing devices, as defined herein, come equipped with a specialized program, known as a web browser, which enables them to act as a client device 120 at least for the purposes of receiving and displaying data output by the server 122 without any additional programming. Web browsers can also act as a platform to run so much of a web application as is being performed by the client device 120, and it is a common practice to write the portion of a web application calculated to run on the client device 120 to be operated entirely by a web browser. Such browser-executed programs are referred to herein as "client-side programs," and frequently are loaded onto the browser from the server 122 at the same time as the other content the server 122 sends to the browser. However, it is also possible to write programs that do not run on web browsers but still cause an computing device to operate as a web application client 120. Thus, as a general matter, web applications 123 require some computer program configuration of both the client device (or devices) 120 and the server 122. The computer program that comprises the web application component on either computing device's system FIG. 1A configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Furthermore, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

The one or more client devices 120 and the one or more servers 122 may communicate using any protocol according to which data may be transmitted from the client 120 to the server 122 and vice versa. As a non-limiting example, the client 120 and server 122 may exchange data using the Internet protocol suite, which includes the transfer control protocol (TCP) and the Internet Protocol (IP), and is sometimes referred to as TCP/IP. In some embodiments, the client and server 122 encrypt data prior to exchanging the data. In one embodiment, the client 120 and server 122 exchange the data using public key cryptography; for instance, the client and the server 122 may each generate a public and private key, exchange public keys, and encrypt the data using each others' public keys while decrypting it using each others' private keys.

Embodiments of the disclosed method and system use the lack of information density that is the defining feature of spam to discover and eliminate spam messages. Because the method and system do not rely on keyword or heuristic identification of spam messages, relatively little memory or processing power is necessary to perform the filtering process; as a result, the filtering process can keep pace with streaming data without causing the transfer of data to the user to drag. Because the identification of spam relies on detecting its worthlessness as information, false positives are minimal, and highly unlikely to eliminate messages that anybody will want to read.

Figure 2:
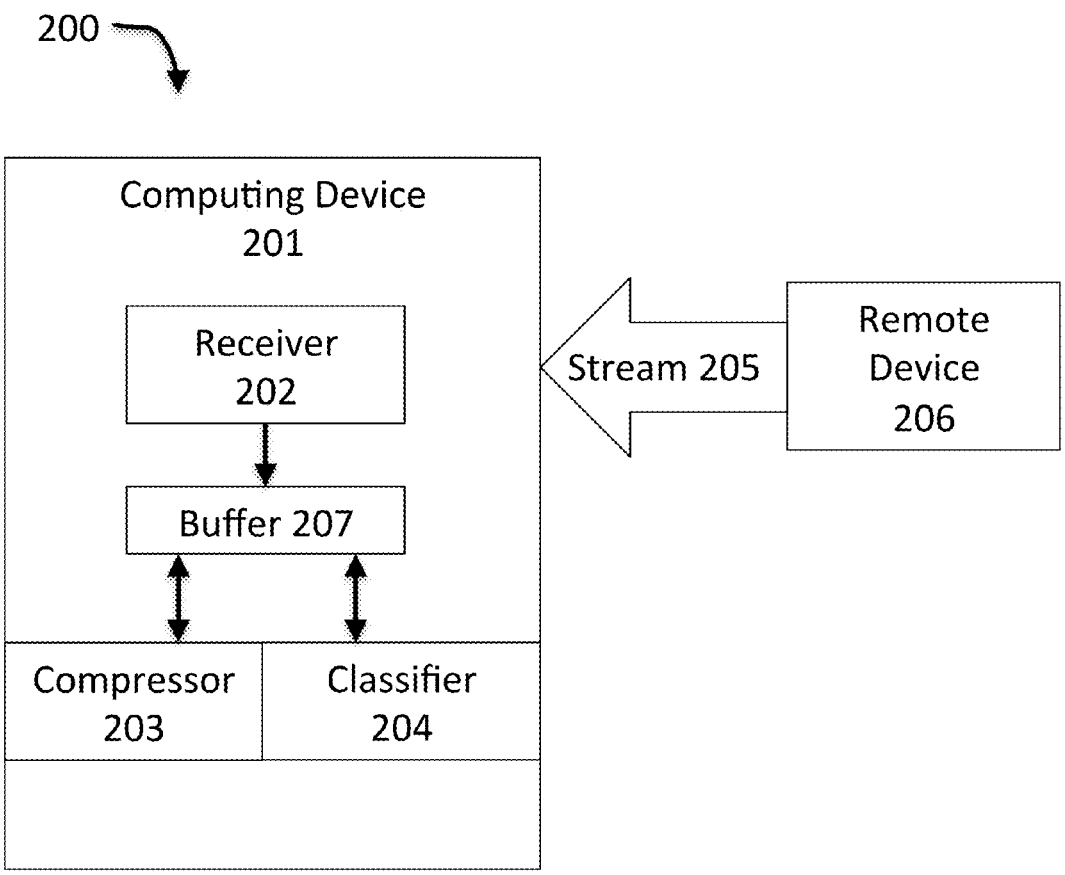
FIG. 2 is a block diagram depicting one embodiment of the disclosed system.

FIG. 2 illustrates some embodiments of the disclosed system 200. The system 200 includes a computing device 201. Executing on the computing device 201 is a set of algorithmic steps that may be conceptually described as creating at least one receiver 202, at least one compressor 203, and at least one classifier 204. The organization of tasks into those three components solely reflects a categorization of the tasks to be performed, and does not dictate the architecture of particular implementations of the system 200. For instance, in some embodiments of the system 200, the steps performed are executed by various objects in an object-oriented language, but the objects divide the tasks in a different manner than the above division. In other embodiments, the algorithmic steps exist as a set of instructions in a non-object oriented language, with no explicit separation of responsibility for steps into distinct components at all. Persons skilled in the art will recognize the existence of a broad variety of programming approaches that could cause the computing device 201 to perform the algorithmic steps.

Figure 1B:
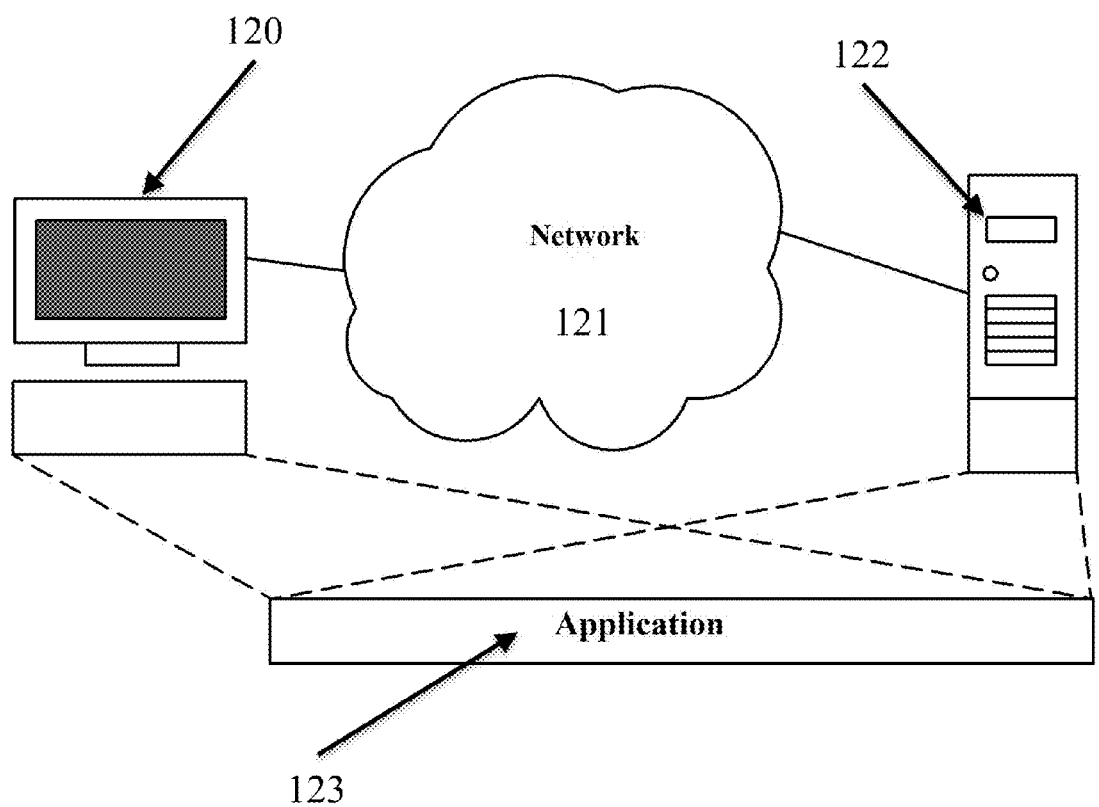
FIG. 1B is a schematic diagram of a network-based platform, as disclosed herein.

Referring to FIG. 2 in more detail, the system 200 includes a computing device 201. In some embodiments, the computing device 201 is a computing device 100 as disclosed above in reference to FIG. 1A. In other embodiments, the computing device 201 is a set of computing devices 100, as discussed above in reference to FIG. 1A, working in concert; for example, the computing device 201 may be a set of computing devices in a parallel computing arrangement. The computing device 201 may be a set of computing devices 100 coordinating their efforts over a private network, such as a local network or a virtual private network (VPN). The computing device 201 may be a set of computing devices 100 coordinating the efforts over a public network, such as the Internet. The division of tasks between computing devices 100 in such a set of computing devices working in concert may be a parallel division of tasks or a temporal division of tasks; as an example, several computing devices 100 may be working in parallel on components of the same tasks at the same time, where as in other situations one computing device 100 may perform one task then send the results to a second computing device 100 to perform a second task. In one embodiment, the computing device 201 is a server 122 as disclosed above in reference to FIG. 1B. The computing device 201 may communicate with one or more additional servers 122. The computing device 201 and the one or more additional servers 122 may coordinate their processing to emulate the activity of a single server 122 as described above in reference to FIG. 1B. The computing device 201 and the one or more additional servers 122 may divide tasks up heterogeneously between devices; for instance, the computing device 201 may delegate the tasks of the receiver 202 to an additional server 122. In some embodiments, the computing device 201 functions as a client device 120 as disclosed above in reference to FIG. 1B.

The at least one receiver 202 executes on the computing device 201. The at least one receiver 202 in some embodiments is a computer program as described above in reference to FIGS. 1A and 1B. In some embodiments, the at least one receiver 202 is configured to receive a stream 205 of messages. In one embodiment, a stream is media that is continuously transmitted to the computing device 201. One or more remote devices 206 producing the stream may collect data from various sources via a network such as the Internet, and continuously forward that data to the at least one receiver 202. The data may include textual data; the textual data may include any information that may be represented textually, such as characters belonging to any human writing system, numbers, and punctuation. Binary data, represented as sequences of binary encodings, may also be textual data. An example of a textual stream is the data produced by the live-streaming services provided by such as the TWITTER social networking service produced by Twitter, Inc. of San Francisco, Calif. The data may include audio data. The data may include video data, such as one or more images or videos. The data may combine one or more of the above categories of data; for instance, the data may embed video or audio files or images in text. The stream may emanate from one or more remote devices 206. The stream may also be generated by a process initiated by the computing device 201, such as repeated search queries submitted to search engines such as the GOOGLE search engine produced by Google, Inc. of Mountain View, Calif.; the results returned may be converted into a stream by the computing device 201 or a service on a remote device 206. The stream may likewise be produced by a device that converts any frequently updating data into a continuous feed of data; for instance, a remote device 206 may convert electronic mail (email) messages, such as those sent according to the simple mail transfer protocol (SMTP), conveyed to one or more email accounts, or comments on a social networking or news site into a stream.

In some embodiments, the stream is divided into messages. In an embodiment, a message is collection of text used by a textual stream 205 as a single unit of conversation. A message may include a post to a comment thread or discussion board. A message may include a text message, such as those sent via Simple Messaging Service (SMS). A message may include an email message. A message may include a document, such as a word processor document or portable document file (PDF). The document may be attached to an email message. The document may be electronically transferred, for instance via File Transfer Protocol (FTP). A message may include the text associated with a single post to TWITTER (i.e. a "tweet"). A message may include a web page, such as a file displaying using Hypertext Transfer Protocol (HTTP). A message may include a sentence in an audio conversation, such as a conversation conducted via Voice over Internet Protocol (VoIP). A message may include a photograph that contains an image of text. A message may include video data that contains an image of text.

Embodiments of the disclosed system and method relate to the manipulation of terms. In one embodiment, a term is a unit of data representable in textual form. A term may be a word. A term may be a phrase. A term may be any string of symbols that may be represented as text on a computing device 100 as described above in reference to FIGS. 1A-1B. A term may be a word or phrase represented in any writing system. A term may be a word or phrase represented in any language. A term may include a sequence of nucleotides described by AGTC notation. A term may include any string of numerical digits. A term may include any string of symbols whether their meanings are known or unknown to any person. A term may be stored in any data type suitable for storing textual data. The term may be stored in a character data type. The term may be stored in an array of character data types. The term may be stored in a string. Terms may be extracted from files or network packets containing text. Terms may be extracted from digital images, such as video and still photographs, depicting text; for instance, terms may be extracted from visual images using character recognition software. Terms may be extracted from audio data; for instance, the computing device 201 may transform an audio stream into text using voice recognition software, and extract terms from the resulting text.

In some embodiments, the at least one receiver 202 directs the stream into at least one buffer 207. In one embodiment, directing the stream into at least one buffer 207 is accomplished by continuously adding received data into the buffer 207 as it arrives. In some embodiments, a buffer 207 is a portion of the memory of the computing device 201 where data is stored temporarily. The at least one buffer 207 may be one or more buffers 207; for example, the computing device 201 may create more buffers 207 when the speed with which data arrives in the stream 205 accelerates. In some embodiments, each compressor of the at least one compressor 203 functions with a buffer 207 of a defined size, and thus if the stream 205 delivers data faster than the rate of compression of the buffer 207, the at least one receiver 202 may create more buffers 207 so that the at least one receiver 202 can continuously direct the stream 205 into the at least one buffer 207. The at least one receiver 202 may be a single receiver 202. The at least one receiver 202 may be several receivers 202 working in parallel, according to any parallel processing protocol.

The at least one compressor 203 executes on the computing device 201. The at least one compressor 203 in some embodiments is a computer program as described above in reference to FIGS. 1A and 1B. In some embodiments, the at least one compressor 203 is configured to repeatedly compress data in the at least one buffer using a lossless compression algorithm. In one embodiment, a lossless compression algorithm is an algorithm that reduces the data in a file while preserving the file's information content; in other words, the uncompressed file may be substantially perfectly reconstructed from the compressed version of the file. The at least one compressor 203 may be one compressor 203. The at least one compressor 203 may be several compressors 203 working in parallel, according to any parallel processing protocol. There may be one compressor 203 for each buffer of the at least one buffer 207.

The at least one classifier 204 executes on the computing device 201. The at least one classifier 204 in some embodiments is a computer program as described above in reference to FIGS. 1A and 1B. In some embodiments, the at least one classifier 204 is configured to identify at least one message in the buffer as spam by determining that the at least one first message has been compressed below a threshold level. In one embodiment, a message is "spam" if its contents are repeated in substantially identical forms a plurality of times. The repetition of spam may involve the creation of a plurality of exact duplicates of a message. The repetition may involve the creation of a plurality of messages with nearly exactly identical contents; for instance, the same message body may be associated with varying titles. The same message body may be associated with varying originating user accounts, which may be collected by a single malware network and used for the purpose of sending ostensibly distinct messages. The same message body may be associated with varying metadata. In some embodiments, repetition involves the repeated generation of a largely identical message body with trivial alterations. For example, a first spam message may state that "Lauren could not believe it was possible to make $2,300 per day working from home for only 30 hours a week," while a second spam message may state that "Gina could not believe it was possible to make $3,100 per day working from home for only 28 hours a week." The repetition may involve the repeated reuse in many messages of a single phrase, such as "one weird trick," or "one simple rule doctors don't want you to know about." The repetition may involve the inclusion in apparently distinct messages of the same reference to a product or service being advertised by the message; for instance, a natural language processing program may produce various messages containing apparently distinct combinations of words and phrases, each of which contains a URL to the advertised product or service.

In some embodiments, the contents of spam have no genuine substantive relationship to the topic to which the other messages in the stream are directed; for instance, if the stream is transmitting messages on a particular topic, spam messages may have contents generally unrelated to the topic. The entirety of the message may be unrelated to the topic, but posted to a conversation thread on the subject of the topic. The message may contain metadata indicating a relationship to the topic while containing a message body unrelated to the topic; for instance, the spam message may contain a "hashtag" associated with the 2014 world cup of soccer while containing a message body touting a purported pharmaceutical product. In other embodiments, the spam message has an unrelated body with a superficial word or phrase inserted to create the illusion that it relates to the topic. For instance, the message may have an inserted phrase associated with the topic, while the remainder of the message body has no relationship to the topic whatsoever; as an example, where the topic is the 2014 World Cup, the message may state: "I think Brazil is going to win the World Cup. You won't believe how easy it is to lose weight by eating this one weird fruit!"

Figure 3:
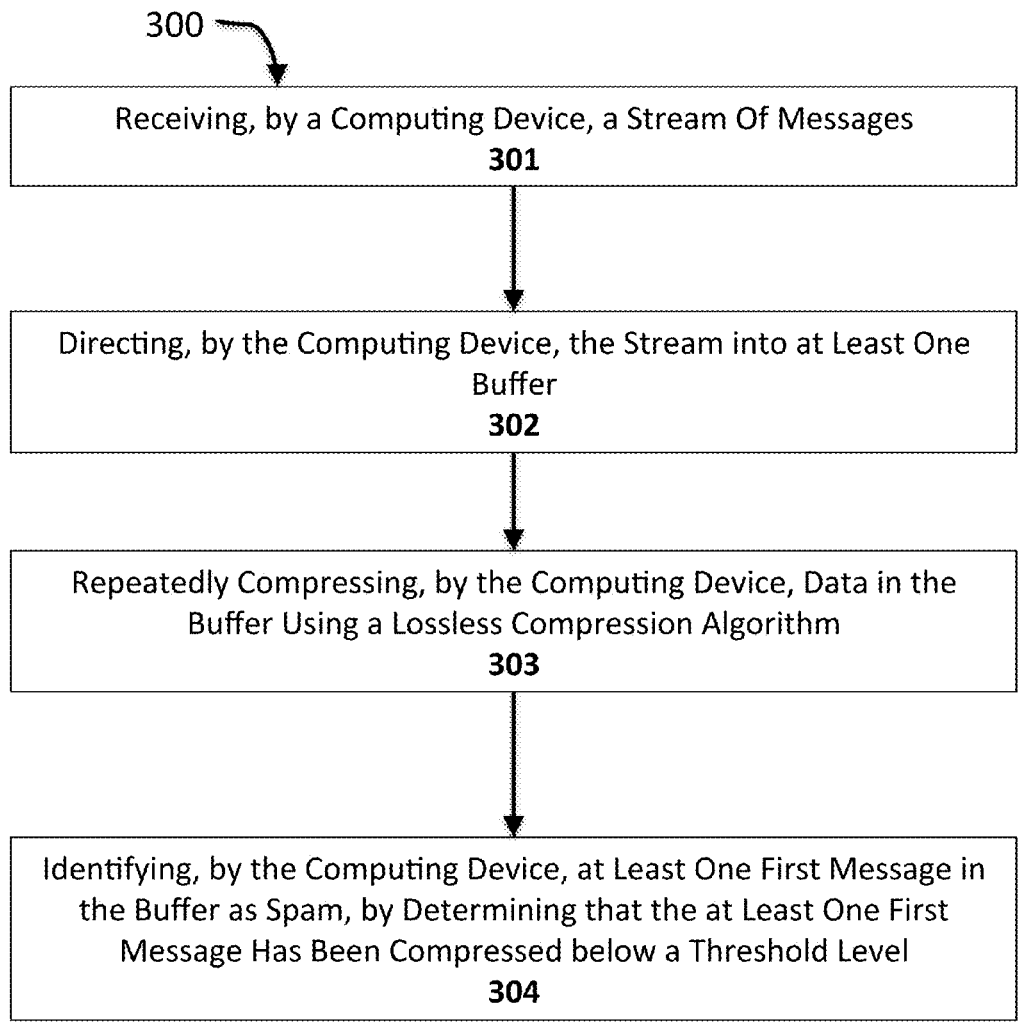
FIG. 3 is a flow chart illustrating one embodiment of the claimed method.

FIG. 3 illustrates some embodiments of a method 300 for elimination of spam in a data stream according to information density. The method 300 includes receiving, by a computing device, a stream of messages (301). The method 300 includes directing, by the computing device, the stream into a buffer (302). The method 300 includes repeatedly compressing, by the computing device, data in the buffer using a lossless compression algorithm (303). The method 300 identifying, by the computing device, at least one first message in the buffer as spam, by determining that the at least one first message has been compressed below a threshold level (304).

Referring to FIG. 3 in greater detail, and by reference to FIG. 2, receiver 202 receives a stream 205 of messages (301). In some embodiments, the receiver 202 creates a session with a remote device 206; the creation of a session may cause the remote device 206 to start streaming messages to the receiver 202. In other embodiments, the receiver 202 sends to the remote device 206 data limiting the stream 205. For instance, the receiver 202 may send a query to the remote device 206 requesting one or more topics. The receiver 202 may send a query to the remote device 206 requesting that one or more topics not be included in the stream 205. In some embodiments, the receiver 202 causes the stream to begin transmitting to the receiver 202 by sending data to a remote device 206 as discussed above. In other embodiments, the stream 205 is already in the process of transmitting, and will transmit to any device that disposes itself to receive the stream 205. For instance, the receiver 202 may receive the stream 205 by tuning to a particular electromagnetic frequency. The receiver 202 may receive the stream 205 by navigating to a particular IP address. In some embodiment, the receiver 202 receives a stream 205 of messages containing textual data.

The receiver 202 directs the stream 205 into at least one buffer 207 (302). In one embodiment, the receiver 202 directs the stream into the at least one buffer 207 by placing each bit in the at least one buffer 207 substantially immediately after the bit is received. In another embodiment, the receiver 202 directs the stream into the at least one buffer 207 by placing each term in the at least one buffer 207 substantially immediately after the receiver 202 receives the term. In other embodiments, the receiver 202 directs the stream into the at least one buffer 207 by placing each message in the at least one buffer 207 substantially immediately after the receiver 202 receives the message.

Where the at least one buffer 207 is a plurality of buffers, the receiver 202 may split the stream 205 and divide it among the plurality of buffers. In some embodiments, the receiver 202 splits the stream by messages; in other words, the receiver 202 may direct a first message into a first buffer, a second message into a second buffer, and so forth. In other embodiments, the receiver 202 splits the stream by topics; the receiver 202 may direct a first topic into a first set of buffers and a second topic into a second set of buffers. The receiver 202 may split the portion of a stream concerning a topic still further by messages or terms. In some embodiments, rather than placing alternate messages in alternate buffers, the receiver 202 fills one buffer with messages, creates a second buffer, and then begins directing the stream 205 into the second buffer. In some embodiments, the receiver 202 also monitors each buffer to determine whether the buffer has gained additional space; the buffer may increase its capacity, for instance, as a result of the compression. The buffer may also increase its capacity if some messages are removed from the buffer, as described in further detail below. In another embodiment, the computing device 201 maintains a certain number of buffers, each with a corresponding compressor and an index number; in this embodiment, the receiver 202 uses an identical hashing algorithm to hash each message to produce a number, calculates that number mod the number of compressors to obtain the index number of one of the compressors, and assigns the message to the compressor having that index number. By using the same hashing algorithm for each message, all identical messages may be assigned to the same compressor. In some embodiments, one buffer of the at least one buffer 207 is discarded after a certain point, as described in further detail below, and the receiver 202 directs the stream 205 or a portion of the split stream into a new buffer instead of the discarded buffer.

The compressor 203 compresses data in the buffer using a lossless compression algorithm (303). In one embodiment, where the stream 205 contains text, the compressor 203 compresses the data by determining that a term in the buffer has been encountered previously, mapping the term to a single character representation, and replacing each subsequent instance of the term in the buffer with the single character representation. In some embodiments, this technique compresses messages to a greater degree if the messages have fewer unique combinations of words; for example, the sentence fragment "One weird trick to lose weight quickly" may be compressed to only three symbols on the first encounter: one for "One weird trick," one for "to," and one for "lose weight quickly," owing to a previous encounter of those phrases in other spam, while a second appearance may cause the fragment to collapse to a single symbol, and if two messages in a row consist of that single fragment, the two messages may together be replaced with one symbol. In contrast, a single non-repeating message saying, "a furious calm smelled the colorless yellow ennui" would compress only down to a set of symbols of cardinality matching the number of words in the message, if those individual words were previously encountered. The compressor 203 may replace each previously encountered term with a symbol associated with that term. The compressor 203 may act recursively, repeatedly reviewing the buffer and replacing each previously encountered sequence of symbols associated with terms with an additional symbol corresponding to that sequence of symbols. Previously encountered terms may be stored in at least one memory buffer. The mapping of previously encountered terms to symbols may also be stored in the memory buffer. The compressor 203 may consult the memory buffer for the mapping, so that it can replace the previously encountered terms with the symbols to which they map.

The classifier 204 identifies at least one first message in the buffer 207 as spam, by determining that the at least one first message has been compressed below a threshold level (304). In some embodiments, the compressor 203 outputs the contents of the buffer 207 to the classifier 204. In other embodiments, the compressor 203 terminates after achieving a benchmark, releasing the buffer 207 to be examined by the classifier 204. The benchmark may be a predetermined amount of time from the onset of compression after which the compressor 203 terminates. The benchmark may be a predetermined number of compression cycles from the onset of compression after which the compressor 203 terminates. The benchmark may be a predetermined quantity of data received by the buffer after the onset of compression. The compressor 203 may self-terminate; in other embodiments, the computing device 201 determines that the compressor 203 has achieved the benchmark and terminates the compressor 203. In an additional embodiment, the classifier 204 copies a compressor 203 and its corresponding buffer, and terminates the copied compressor 203 while the original compressor 203 continues to run; the copied compressor 203 may then output the buffer, or it may output numbers corresponding to the compressed size or compression ratio of each message. In some embodiments, the classifier 204 determines that the at least one first message has been compressed below a threshold level further comprises determining that the ratio of the compressed size of the at least one first message to the uncompressed size of the at least one first message is smaller than a threshold number. In other embodiments, the classifier 204 determines that the at least one first message has compressed to an absolute size, such as a number of bytes, less than the threshold amount. The at least one first message may be several messages; for instance, the classifier 204 may traverse the buffer and identify each message falling below the threshold as spam.

In some embodiments, upon classifying the at least one first message as spam, the classifier 204 deletes the at least one first message. Where the buffer was output by the compressor 203, the classifier 204 may pass an instruction to the compressor 203 to delete the at least one first message. Where the compressor 203 terminated to release the buffer, the classifier 204 may directly delete the at least one first message. Alternatively, the classifier 204 may remove each message not identified as spam from the buffer, store the removed messages separately, and then delete the entire buffer.

In another embodiment, upon determining that the at least one first message is spam, the classifier 204 may store the at least one first message in a spam folder. In one embodiment, a spam folder is a place in memory where spam messages are kept; substantially all the contents of the spam folder may consist of spam messages. In other embodiments the classifier 204 identifies an account from which the at least one first message originated. Identifying the account may involve identifying a remote device from which the spam message originated. Identifying the account may involve identifying a user account identifier, such as a username from which the spam message originated. In some embodiments, all messages from the identified account that are analyzed by the classifier 204 are also identified as spam. The classifier 204 may publish the identified account to a user of the computing device; for instance, the user may be able to report the account to the proprietor of a remote device 206 producing the stream 205, where the account is registered. The classifier may block reception of future messages from the account; for instance, where the account only produces spam, the most efficient way to reduce spam in the stream 205 may be to filter out all messages from the account before the receiver 202 receives them.

In some embodiments, the classifier 204 determines that at least one second message in the buffer is not spam. The classifier 204 may determine that the at least one second message has not compressed below the threshold level. In some embodiments, the classifier 204 determines that the at least one second message is not spam by maintaining in memory accessible to the computing device a datum representing a quantity of data received in the stream, determining that the computing device 201 has received a greater quantity of data in the stream than the quantity represented by the datum since receiving the at least one second message, and determining that the at least one second message has not compressed below the threshold level. In some embodiments, the classifier 204 determines that the at least one second message is not spam by maintaining in memory accessible to the computing device a datum representing a number of compression cycles, determining that the computing device has performed a greater number of compression cycles than the datum since receiving the at least one second message, and determining that the at least one second message has not compressed below the threshold level. The classifier 204 may determine that each message in the buffer is either spam or not spam.

In some embodiments, the classifier 204 provides the at least one second message to a user of the computing device 201. Providing may include displaying the at least one second message on a display coupled to the computing device 201. Providing may include printing the at least one second message using a printer coupled to the computing device 201. Providing may include transmitting the at least one second message to another computing device used by the user; for instance, providing may include transmitting the at least one second message to a mobile device the user is carrying. In some embodiments, the classifier 204 provides the at least one second message to the user by storing the at least one second message in location where the user may encounter the at least one second message; for instance, the classifier 204 may make the at least one second message available in a format permitting users to browse messages, such as a website. The classifier 204 may place the at least one second message in a database that the user may query to find the at least one second message; a user interface may assist the user in querying the database.

It will be understood that the system and method may be embodied in other specific forms without departing from the spirit or central characteristics thereof. The present examples and embodiments, therefore, are to be considered in all respects as illustrative and not restrictive, and the system method is not to be limited to the details given herein.

What is claimed is:

1. A method for elimination of spam in a data stream according to information density, the method comprising:
   receiving, by a computing device, a stream of messages;
   directing, by the computing device, the stream into at least one buffer;
   repeatedly compressing, by the computing device, data in the buffer using a lossless compression algorithm; and
   identifying, by the computing device, at least one first message in the buffer as spam, by determining that the at least one first message has been compressed below a threshold level;
   wherein determining that the at least one first message has been compressed below the threshold level further comprises determining that the ratio of the compressed size of the at least one first message to the uncompressed size of the at least one first message is smaller than a threshold number.

2. A method according to claim 1, wherein receiving further comprises receiving a stream of messages containing textual data.

3. A method according to claim 2, wherein compressing further comprises:
   determining that a term in the buffer has been encountered previously;
   mapping the term to a single character representation; and
   replacing the term in the buffer with the single character representation.

4. A method according to claim 1 further comprising deleting the at least one first message.

5. A method according to claim 1 further comprising storing the at least one first message in a spam folder.

6. A method according to claim 1 further comprising identifying an account from which the at least one first message originated.

7. A method according to claim 6 further comprising publishing the account to a user of the computing device.

8. A method according to claim 6 further comprising blocking the reception of future messages from the account.

9. A method according to claim 1 further comprising determining that at least one second message in the buffer is not spam.

10. A method according to claim 9 wherein determining that the at least one second message is not spam further comprises:
    maintaining in memory accessible to the computing device a datum representing a quantity of data received in the stream;
    determining that the computing device has received a greater quantity of data in the stream than the quantity represented by the datum since receiving the at least one second message; and
    determining that the at least one second message has not compressed below the threshold level.

11. A method according to claim 9 wherein determining that the at least one second message is not spam further comprises:
    maintaining in memory accessible to the computing device a datum representing a number of compression cycles;
    determining that the computing device has performed a greater number of compression cycles than the datum since receiving the at least one second message; and
    determining that the at least one second message has not compressed below the threshold level.

12. A method according to claim 9 further comprising providing the at least one second message to a user of the computing device.

13. A system for elimination of spam in a data stream according to information density, the system comprising:
    a computing device;
    at least one receiver, executing on the computing device, and configured to receive a stream of messages and direct the stream into at least one buffer;
    at least one compressor, executing on the computing device, and configured to repeatedly compress data in the buffer using a lossless compression algorithm; and
    at least one classifier, executing on the computing device and configured to identify at least one message in the buffer as spam by determining that the at least one first message has been compressed below a threshold level;

wherein determining that the at least one first message has been compressed below the threshold level further comprises determining that the ratio of the compressed size of the at least one first message to the uncompressed size of the at least one first message is smaller than a threshold number.

* * * * *